United States Patent
Hughes

(10) Patent No.: US 7,216,897 B1
(45) Date of Patent: May 15, 2007

(54) ACTIVE TORQUE REDUCTION FOR HYDRAULICALLY FILLED JOINTS

(75) Inventor: Robert Hughes, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 197 days.

(21) Appl. No.: 10/868,453

(22) Filed: Jun. 11, 2004

(51) Int. Cl.
*F16L 27/04* (2006.01)

(52) U.S. Cl. .................. 285/9.1; 285/94; 285/263; 2/905

(58) Field of Classification Search ............ 285/9.1, 285/94, 96, 98, 261, 263; 2/2.15, 905; 405/196
See application file for complete search history.

(56) References Cited

U.S. PATENT DOCUMENTS

| | | | | |
|---|---|---|---|---|
| 1,146,781 A | * | 7/1915 | Bowdoin | 285/96 X |
| 1,888,026 A | * | 11/1932 | Chapman | 285/263 X |
| 2,557,140 A | * | 6/1951 | Razdowitz | 285/9.1 X |
| 3,759,550 A | * | 9/1973 | Peress | 285/263 X |
| 4,561,679 A | * | 12/1985 | Choate | 285/263 X |

* cited by examiner

*Primary Examiner*—Greg Binda
(74) *Attorney, Agent, or Firm*—James T. Shepherd

(57) ABSTRACT

A system and method reduce starting torque for initial rotational displacement and assure smoothness of motion for continuing displacement of a rotary joint. A rotary joint (either cylindrical or spherical) has a first annular joint member and a second annular joint member separated by a fluid-filled annulus. The second annular joint member is adapted for rotary motion with respect to the first annular joint member. A module fluidly communicating with the fluid-filled annulus creates vibratory micro motions in the fluid of the fluid-filled annulus which is between a pair of seals extending between the first annular joint member and the second annular joint member. The vibratory micro motions induce micro motions in the seals of the rotary joint. The micro motions in the seals reduce the initial torque for the initial displacement and assure smoothness of continuing displacement of either or both of the joint members.

2 Claims, 3 Drawing Sheets

ACTIVE TORQUE REDUCTION FOR HYDRAULICALLY FILLED JOINTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the system and methods for reducing torque for starting displacements of rotary or spherical hydraulic joints and making such displacements smooth. More particularly, this invention relates to a system and method for reducing torque for displacing anthropomorphically configured diving suits to decrease the effort to initiate motion, increase smoothness of motion, and delay the onset of diver fatigue.

Atmospheric Dive Suits (ADS) are one-man anthropomorphically configured submersibles designed for a diver at great water depths while the inside of the ADS remains at the surface pressure of one atmosphere. Rotary joints (spherical and/or cylindrical joints) are most likely to be used for arms and legs. Rotary joints produce arm and leg motions by having joints with surfaces that rotate relative to each other on a common surface. Typically, several rotary joints must be moved relative to each other to produce the desired arm or leg motion. Spherical joints have ball and socket like parts that rotate spherical surfaces spherically over a small arc. A chain of these joints allow arm and leg motion resembling surface locomotion of a human. To create arm or leg motion several might be actuated at once.

Rotary and spherical joints of an ADS both use hydraulic fluid in an oil cavity to provide separation and a bearing surface between the mechanical parts that are connected in limbs of the ADS. The hydraulic pressure in the oil cavity balances and resists the tendency of the water to crush the parts together. The hydraulic pressure is raised so that the surface area of the oil cavity between the mechanical components times the hydraulic pressure is equal to the displaced area of the mechanical components times the ambient pressure.

Rotary and spherical joints have another complicating requirement that makes them susceptible to startup friction, especially at depth. That is, the joints must be designed so that the size of the hydraulic cavity does not change with orientation. Otherwise, the exterior pressure would force the joint into a minimum volume configuration preventing motion.

Although an ADS removes the diver from the direct effect of water pressure, physical exertion to produce motion of the ADS can be tiring. The parasitic exertion is a result of friction from the seals and viscosity of the fluid. Consequently, less "exploratory" activity is likely due to the difficulty on making all joints move. The mass and the momentum of the ADS, and the water resistance required to move the limbs, combine to create inertia and drag resistive motion. A substantial startup-torque is needed to overcome these factors and makes operation physically exhausting. The problems associated with other rotary joints used in other specialized underwater applications, such as thrust vectoring nozzles for propulsors, or alignment joints for mating sections for manned transfer, also can have excessive resistance proportional to drag that must be overcome by increased force to begin their displacements.

Because of the large balancing forces involved to displace intricate joints in the ADS, the small deflections that occur with increasing depth tend to greatly increase the startup torque required to move the joints. This adversely affects a working diver, as each motion requires more effort. Divers tire faster, are limited in motion, and use up the life support faster. Replacing a diver at 2000 foot depths takes 35 minutes for the first diver to surface, a minimum of 30 minutes change-out (suit prep), and another 35 minutes for another diver to get back down, and this procedure wastes valuable time. With spherical joints, start up torque generally initiates start up motion one joint at a time, so that the start up friction load is only encountered as each joint starts to move. This problem is exacerbated for cylindrical type joints since several joints may need to be initiated simultaneously to make motion, making responsive motion even harder. At significant depths where small jobs needing precise motions are required, the excessive startup torque tends to produce erratic and unsmooth motions for both types of joints. Another limitation is that the inefficient work rates can reduce the life of the life support system. Also, unneeded work efforts can tax the ability of the carbon dioxide scrubbing system to remove the carbon dioxide from the suit adequately.

Thus, in accordance with this inventive concept, a need has been recognized in the state of the art for a system and method for reducing the torque needed to displacing limbs of an anthropomorphically configured diving suit to decrease the effort to initiate motion, increase smoothness of motion, delay the onset of diver fatigue, ensure smooth motion and reduce mechanically activated joints that can be large enough for a man to fit through.

OBJECTS AND SUMMARY OF THE INVENTION

An object of the invention is to provide a system and method to reduce the amount of startup torque for and smooth the motion of cylindrical and spherical joints.

Another object is to provide a system and method to reduce startup torque for initial rotational displacement and increase smoothness of continuing displacement of cylindrical and spherical hydraulically compensated pressurized joints.

Another object of the invention is to provide a system and method to increase the portion of a diver's effort into useful work, to allow more precise and accurate motion, and to direct the diver's efforts to the work at hand.

Another object is to provide a system and method that can reduce power requirements and the size of the assisting power source.

Another object of the invention is to provide a system and method to improve operation of other joints used in other specialized uses underwater, such as alignment of joints between undersea habitats, thrust vectoring nozzles for propulsors, etc.

These and other objects of the invention will become more readily apparent from the ensuing specification when taken in conjunction with the appended claims.

Accordingly, the system and method of the invention reduce starting torque for initial rotational displacement and assure smoothness of motion for continuing displacement of a rotary joint. A rotary joint that can be either a cylindrical or a spherical joint has a first annular joint member and a second annular joint member separated by a fluid-filled annulus. The second annular joint member is adapted for rotary motion with respect to the first annular joint member.

A micro motion module has a piezoelectric disk fluidly communicating with the fluid-filled annulus to create vibratory micro motions from small pressure fluctuations in the fluid of the fluid-filled annulus which is between a pair of seals extending between the first annular joint member and the second annular joint member. The vibratory micro motions induce micro motions in the seals of the rotary joint. The micro motions in the seals reduce the initial torque for the initial rotational displacement and assure smoothness of continuing displacement of either or both of the joint members. Torque is reduced because initial motion is overcoming dynamic friction verses static friction whose coefficient is smaller.

DESCRIPTION OF THE PREFERRED EMBODIMENTS

Figure 1:
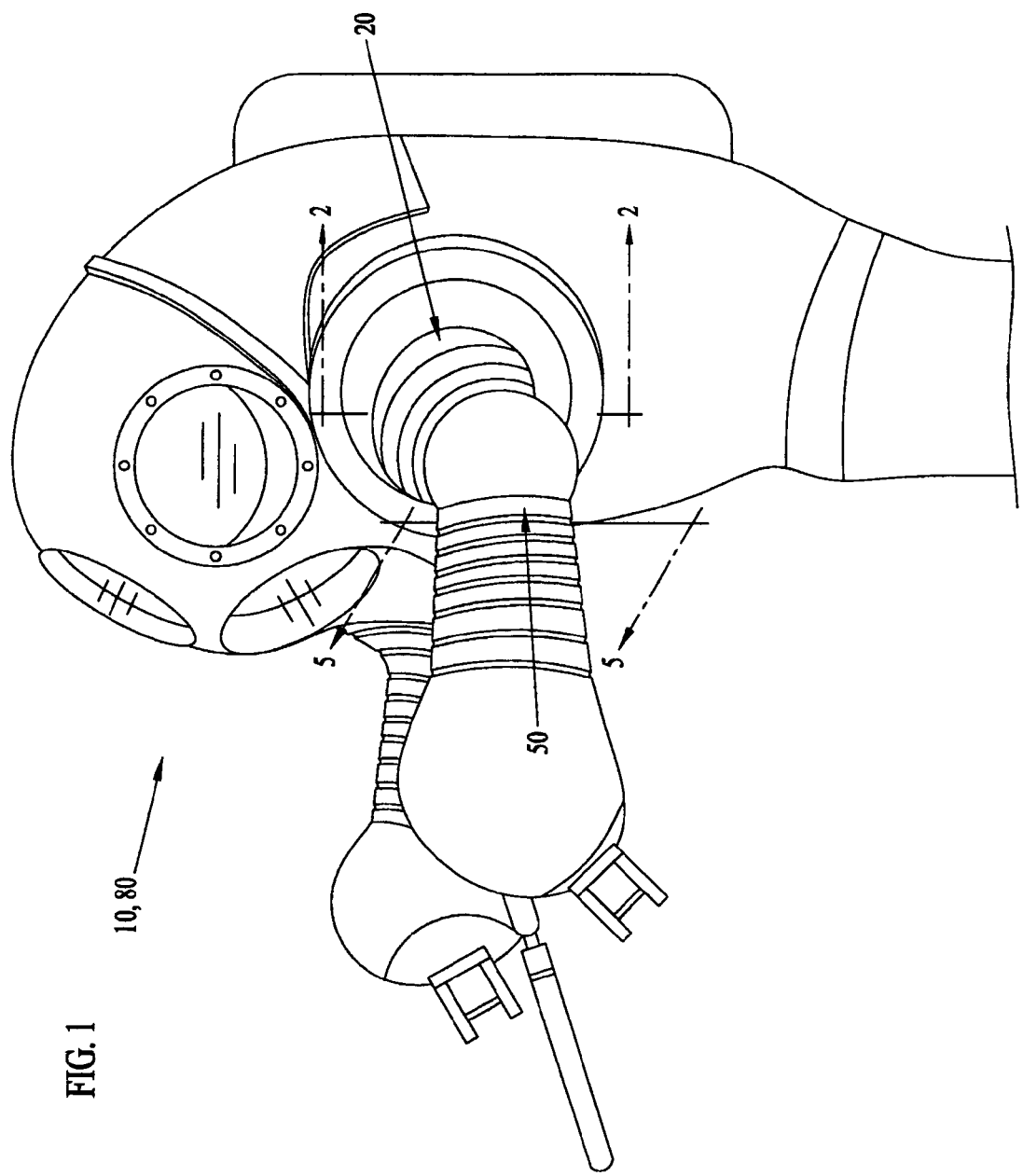
FIG. 1 is an isometric schematic view of an atmospheric dive suit having torque reduction of the invention to improve performance of cylindrical and spherical joints.

Referring to FIG. 1, a diver is wearing an atmospheric dive suit (ADS) 10 to perform undersea tasks at considerable depths in the ocean. ADS 10 is a one-man anthropromorphically configured submersible that keeps a diver at the surface pressure of one atmosphere during deep dives. Many contemporary ADSs have rotary joints (cylindrical joints and/or spherical joints) to allow motion of the diver's arms and legs.

Accordingly, ADS 10 has a plurality of rotary joints including cylindrical joints and/or spherical joints, only one cylindrical joint 20 and one spherical joint 50 are designated. Some or all of joints 20, 50 of ADS 10 could be modified to include a torque reduction system 80 of the invention as part of each to reduce the amount of startup torque needed to begin their displacements and increase the smoothness of motion during their continuing displacements.

Figure 2:
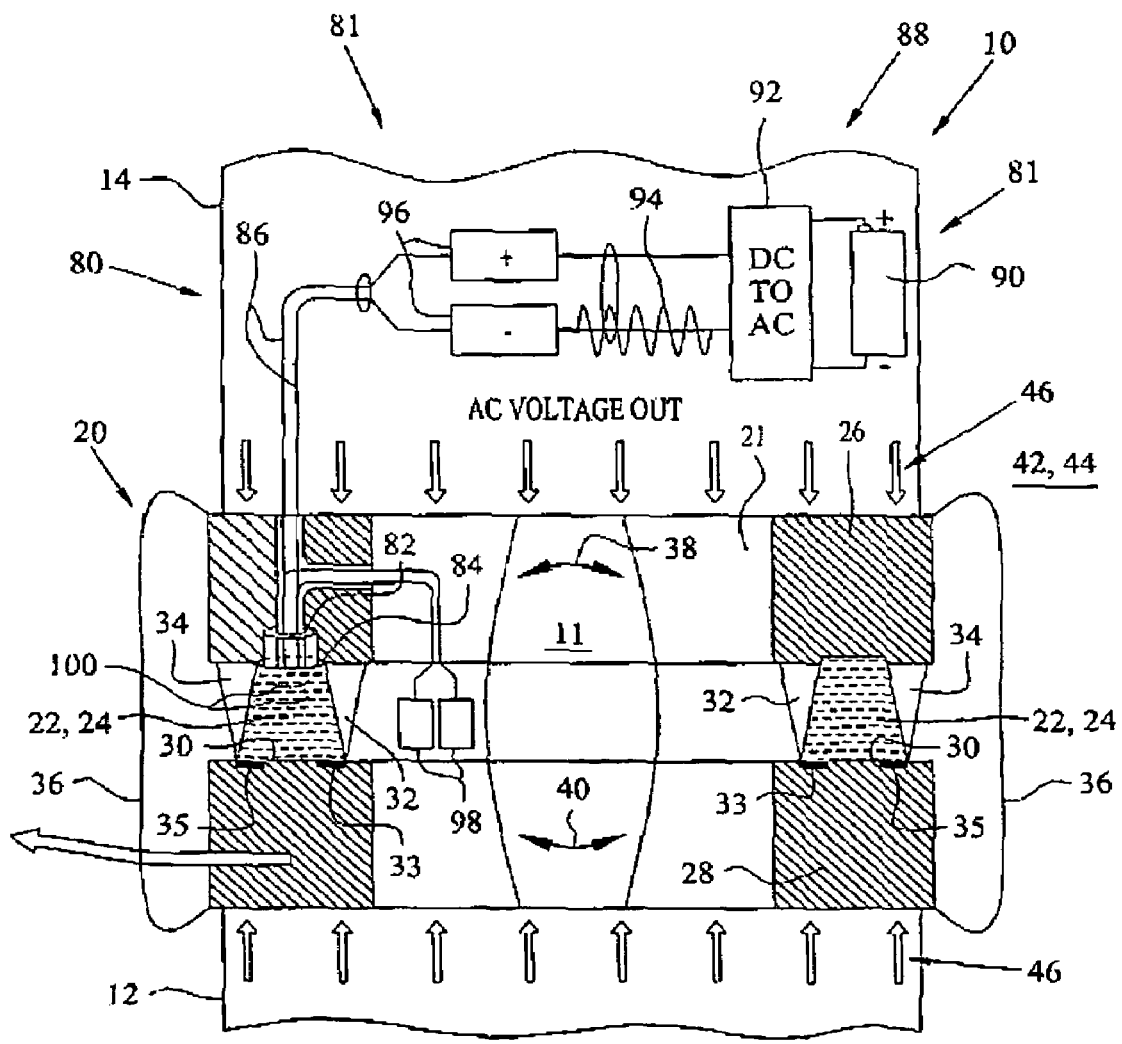
FIG. 2 is a cross-sectional schematic view (taken generally along line 2—2 in FIG. 1) of the torque reduction system of the invention improving performance of a cylindrical joint.

Referring also to FIG. 2, in accordance with current practice, cylindrical joints, such as the only designated cylindrical joint 20 in FIG. 1, can produce arm or leg motion resembling surface locomotion of a human by having joints with surfaces that rotate relative to each other. This motion is in response to movement of an arm or leg 11 extending through an interior 21 of cylindrical joint 20 that is connected to other structural parts 12 and 14 of ADS 10. A single cylindrical joint 20 can be used at some places in ADS 10, or multiple cylindrical joints also can be displaced relative to each other to achieve to desired arm or leg motion. Multiple joints can define wedge-like shapes having faces at angles of 30–45 degrees between the two faces. In order to create needed arm and leg motion, a series of such joints may be moved.

Cylindrical joint 20 works by using hydraulic fluid 22 in a fluid or oil-filled annulus 24 that is pressurized to provide separation between an upper annular joint member 26 and a lower annular joint member 28. Pressurized hydraulic fluid 22 in annulus 24 creates a sealed annular bearing surface 30 on lower annular joint member 28 between an inner and outer annular knife edge seal 32 and 34 that each contacts a separate one of annular seats 33 and 35 on lower joint member 28. FIG. 2 shows knife edge seals 32, 34 mounted one way, but knife edge seals 32, 34 can be connected at their wider ends to either one of upper or lower joint members 26, 28, and their opposite narrower ends and annular seats 33, 35 can be at the other one of members 26, 28.

A number of retainers 36 contact upper and lower joint members 26, 28. Retainers 36 exert a converging force that holds upper and lower joint members 26, 28 adjacent one another and separated by annular knife edge seals 32, 34. Knife edge seals 32, 34 are held on annular seats 33, 35 around bearing surface 30 when cylindrical joint 20 is not subjected to an ambient pressure differential, e.g. when joint 20 is in air and not submerged. Retainers 36 can be elastic strips or spring biased clips that can engage upper and lower joint members 26, 28 in such a manner as to permit rotational displacement of at least one of the joint members with respect to the other joint member in either of the rotational directions as shown by arrows 38 and 40 or to permit simultaneous rotational displacements in relative opposite directions with respect to each other as shown by rotationally bidirectional arrows 38, 40.

The pressure of hydraulic fluid 22 in pressurized oil-filled annulus 24 times the surface area of annular bearing surface 30 is made to be equal to the sum of the force exerted by retainers 36 plus the exterior pressure load which is the force equal to the product of the displaced area of upper and lower joint members 26, 28 times the ambient pressure (pressure 42 of surrounding water 44). The exterior pressure load is schematically represented by arrows 46 across upper and lower joint members 24, 26 in FIG. 2. This balancing of forces allows cylindrical joint 20 to float on a fluid bearing of oil-filled annulus 24.

Figure 3:
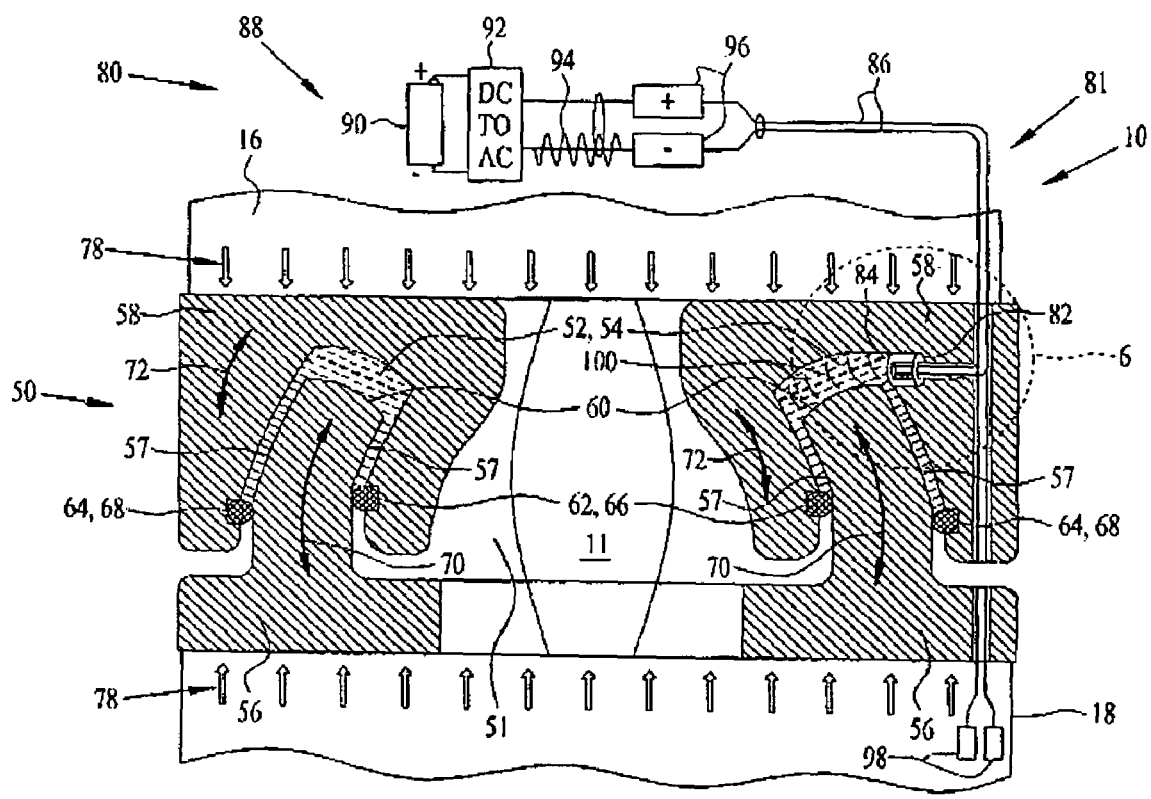
FIG. 3 is a cross-sectional schematic view (taken generally along line 5—5 in FIG. 1) of the torque reduction system of the invention improving performance of a spherical joint.
Figure 4:
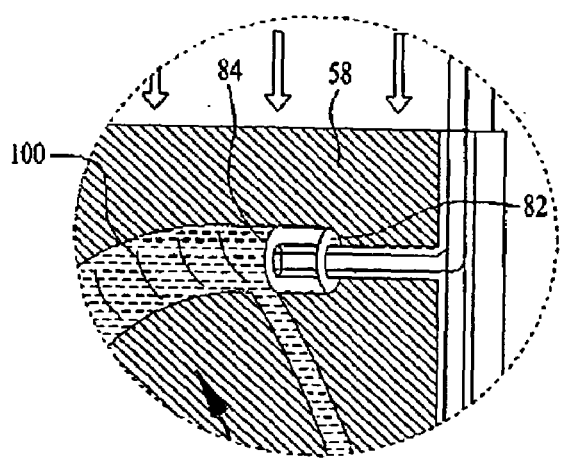
FIG. 4 depicts a detail of the torque reduction system of the invention of FIG. 3.

Referring also to FIGS. 3 and 4, spherical joints, such as the only designated spherical joint 50 in FIG. 1 can produce arm and leg motion resembling surface locomotion of a human. This motion is in response to movement of an arm or leg 11 extending through an interior 51 of spherical joint 50 that is connected to structural parts 16 and 18 of ADS 10. A single spherical joint 50 can be used at some places in ADS 10, or multiple spherical joints can be moved relative to each other to produce arm or leg motion. The combined torque that must be exerted to produce large rotational displacements can be large due to the need to move joints as a group or activated one after another, and each spherical joint 50 operates by ball-and-socket mechanical coactions, in which one spherical surface (in this case a shell-like sector of a hemispherical surface) can spherically rotate in a mating member over a small arc.

Spherical joint 50 has hydraulic fluid 52 in a fluid or oil-filled annulus 54 that is pressurized to provide separation between a hemispherically shell-shaped lower annular segment joint member 56 and a hemispherically shell-shaped downwardly facing upper annular female joint member 58. Lower annular segment joint member 56 extends into upper annular female joint member 58 to create a sealed annular bearing surface 60 between the mechanical components of lower segment member 56 and upper female member 58 by an inner O-ring seal 62 and outer annular O-ring seal 64 respectively retained in standard O-ring grooves 66 and 68 in upper female member 58. The shape and fit of lower annular segment member 56 and annular female member 58 and the engagement of annular segment member 56 by O-ring seals 62, 64 can hold annular segment member 56 and annular female member 58 together and hold O-ring seals 62, 64 against annular segment member 56 on opposite sides of annular bearing surface 60 when spherical joint 50 is not subjected to an ambient pressure differential, e.g. when joint 50 is in air and not submerged. The shape and fit of annular segment member 56 and annular female member 58 and the engagement of annular segment member 56 by O-ring seals 62, 64 permit rotational displacements of annular segment joint member 56 in female joint member 58 as schematically shown by rotationally bidirectional arrows 70 and 72 and rotation about centerline of the axis also. The rotational displacements are made in such a manner as to permit rotational displacement of at least one of the joint members with respect to the other joint member in either of the rotational directions as shown by arrows 70, 72 or to permit simultaneous rotational displacements in relative opposite directions with respect to each other as shown by rotationally bidirectional arrows 70, 72

The pressure of hydraulic fluid 52 in pressurized oil-filled annulus 54 times the surface area of annular bearing surface 60 is made to be equal to the force that is equal to the displaced area of annular segment member 56 and female member 58 times the ambient pressure (pressure of surrounding water). The product of the displaced area of annular segment member 56 and female member 58 times ambient pressure can also be referred to as the exterior pressure load and is schematically represented by arrows 78 across joint members 56, 58 in FIG. 3. This balancing of forces allows spherical joint 50 to float on a fluid bearing of oil-filled annulus 54.

Active torque reduction system 80 of the invention incorporates and modifies some parts of cylindrical joint 20 and spherical joint 50 to significantly decrease the effort to initiate their motion and increase smoothness of their motion of ADS 10. FIGS. 2 and 3 show typical installations of a micro motion module 81 of active torque reduction system 80 as part of cylindrical and spherical joints 20 and 50, respectively, to create vibratory micro motions in hydraulic fluid resulting in minute variations in hydraulic pressure that induces micro motions in the seals of the rotary joints (knife edge seals 32, 34 of cylindrical joint 20 and O-ring seals 62, 64 of spherical joint 50). These micro motions in the seals of the rotary joints reduce initial torque for initial displacement and assure be large enough to effect micro motions that in effect keep the rotary joint moving.

Micro motions of system 80 create dynamic friction on the fluid between constituents of the rotary joints including their seals. Dynamic friction is much less to overcome as compared to the force needed to overcome static friction between static constituents.

Thus, micro motion of hydraulic fluid overcomes the problem of start up torque which is the principle portion of the effort required to make a rotary joint move. However, the micro motions must be as small as possible to minimize energy usage and can not introduce any structural or deleterious mechanical effects on the rotary joint, such as O-ring dislocation or wear from constant motion. Micro motions cannot create mechanical wear caused by metallic parts in contact with other parts, such as retaining rings made of steel on aluminum joints, or knife edges of seals eating into the plastic seats they ride on. The pulsations of energy in the hydraulic fluid should be distributed in such a fashion that the contact points at the seals are in constant motion.

System 80 includes a micro motion module 81 having a standard piezoelectric disk-shaped element 82. Piezoelectric disk-shaped element 82 is in a cavity 84 in upper annular joint member 26 of cylindrical joint 20 and/or in upper female member 58 of spherical joint 50. Each cavity 84 is filled with a portion of hydraulic fluid 22 or 52 to hydraulically couple each piezoelectric disk 82 in fluid communication with oil-filled annulus 24 of cylindrical joint 20 and with oil-filled annulus 54 of spherically joint 50. Cavities 84 and piezoelectric disks 82 could also be in lower annular joint member 28 and annular segment member 56 instead of the other members as described above. The location can be anywhere in a joint as long as it is coupled to the fluid.

Power/control leads 86 extend from a control section 88 to each piezoelectric disk 82 through upper annular joint member 26 of cylindrical joint 20 and upper female member 58 of spherical joint 50. Control section 88 includes a power supply 90, such as a battery connected to a DC to AC converter 92 that delivers an AC signal 94 to connectors 96 coupled to leads 86. Leads 86 can branch off and be coupled to other connectors 98 that can be coupled to other piezoelectric disks (not shown) in additional rotary joints (not shown). Other power transmission schemes to distribute power from a centralized source such as an RF power converter or inductance transfer could be used.

Coupling AC signal 94 to leads 86 creates responsive vibrations of the interconnected piezoelectric disk 82. These vibrations of disks 82 produce tiny variations of hydraulic pressure that are translated to pressure pulses or micro motions 100 in hydraulic fluid 22 of oil-filled annulus 24 of cylindrical joint 20 and hydraulic fluid 52 of oil-filled annulus 54 of spherical joint 50. Because of the high ambient pressures that can be involved (pressure 42 in ambient water 44 and pressure 74 in ambient water 76), each piezoelectric disk 82 needs to be properly sized. Proper sizing of each disk 82 assures that the AC actuation current of AC signal 94 can produce appropriate displacements of piezoelectric disks 82 to create responsive micro motions 100 of hydraulic fluid 22 of oil-filled annulus 24 in cylindrical joint 20 and of hydraulic fluid 52 of oil-filled annulus 54 of spherical joint 50. Other magnetostrictive elements, magnetically displaced devices, or other vibratory mechanisms can be used instead of piezoelectric disks 82 to produce micro motions of hydraulic fluid 22, 52 provided that size, power, and output constraints of the joints and suit are met. Other vibration mechanisms such as shape-memory material or smart materials can also be used.

Micro motions 100 of hydraulic fluids 22 of cylindrical joint 20 are required to achieve the friction reducing effect between hydraulic fluids 22 of oil-filled annulus 24 and contiguous surfaces of upper and lower joint members 26 and 28, and between annular knife edge seals 32, 34 and seats 33, 35 around bearing surface 30. Similarly, micro motions 100 of hydraulic fluids 52 of spherical joint 50 are required to achieve the friction reducing effect between hydraulic fluids 52 of oil-filled annulus 54 and contiguous surfaces of lower annular segment member 56 and upper female member 58, between hydraulic fluids 52 and annular O-ring seals 62, 64 and lateral surfaces 57 of annular segment member 56, and between hydraulic fluids 52 of oil-filled annulus 54 and annular bearing surface 30.

Module 81 of system 80 is made as small as practicable to fit available spaces of existing ADS suits and not enlarge or weaken the rotary joints, primarily because of buoyancy considerations. Module 81 of system 80 is of low enough amperage and voltage to not endanger the diver, and is capable of imparting rotation during operation of ADS 10.

Electrical wiring and circuitry to be described is waterproof to the high pressure, deep water environment and is capable of providing reliable service during long-term rotation of the rotary joints. If used inside of the ADS 10 module 81 of system 80 is waterproofed for this high humidity environment and runs at a low voltage and amperage for safety. For new installations system 80 can be integrated with ADS 10, and the electrical pathways could be integrated into the suit. Even though the seal might just be moving in and out or up and down, it will still create dynamic rather than static friction. Power transfer from joint to joint could be accomplished by using a captive system to move power through the oil and down the limbs. For situations in which energy usage is limited, piezoelectric activators can be activated and stay active if the joints are used within a certain time period or if they are not turned off till new motion is detected. This is an important point in the rotary joint system since pressure and oil can come from a central source and potentially involve one element for the entire hydraulic vibratory system. For advanced applications sensors could be taped to the skin of a diver, and the sensors could activate module 81 of system 80 for the arm or leg being moved by detecting the motion of the arm or leg prior to even making contact with the walls of the ADS to move it.

Micro motion module 81 of system 80 can also improve operation of other joints used in other specialized underwater applications, such as thrust vectoring nozzles for propulsors, or aligned joints between undersea habitats to facilitate transfer of personnel through mating sections to name but a few. Active torque reduction system 80 of the invention reduces the portion of effort that would be otherwise made and converts expended energy into useful and more precise work for the job at hand. System 80 can be used in conjunction with some mechanical assist devices that are used to assist movement in mechanically assisted joints of some ADS systems. System 80 of the invention would allow a reduction of the size of the actuator that would be otherwise needed.

Micro motion module 81 of active torque reduction system 80 of the invention uses of piezoelectric actuators 82 that produce tiny pressure fluctuations (micro motions) 100 within the fluid of rotary joints. Consequently, there is essentially no or very low start up torque, i.e. the joint is for frictional purposes all ready in motion.

Having the teachings of this invention in mind, modifications and alternate embodiments of active torque reduction system 80 may be adapted without departing from the scope of the invention. Active torque reduction system 80 can be made larger or smaller in different shapes and fabricated from a wide variety of materials to assure resistance to corrosion, sufficient strength, and durability for harsh ambient conditions for long term reliable operation under a multitude of different operational conditions and requirements. Active torque reduction system 80 of the invention can be appropriately tailored to adapt in other applications where there is a need to reduce the amount of startup torque and increase the smoothness of motion to provide greater operative effectiveness.

The disclosed components and their arrangements as disclosed herein, all contribute to the novel features of this invention. Active torque reduction system 80 of the invention uses of piezoelectric actuators 82 that produce tiny pressure fluctuations (micro motions) 100 within the fluid of rotary joints to reduce start up torque and smooth the motion of operation. Therefore, active torque reduction system 80 of the invention, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A system for reducing starting torque and assuring smoothness of motion comprising:

a rotary joint having first annular joint member and a second annular joint member separated by a fluid-filled annulus, said second annular joint member being adapted for rotary motion with respect to said first annular joint member;

a motion module fluidly communicating with said fluid-filled annulus for creating vibratory motions in said fluid of said fluid-filled annulus, said motion module comprising:

a cavity in one of said annular joint members, said cavity being in fluid communication with said fluid of said fluid-filled annulus;

a magnetostrictive element in said cavity; and a control section connected to said magnetostrictive element to create and couple AC signals to displace said magnetostrictive element and create responsive vibratory motions of said fluid of said fluid-filled annulus; and a pair of seals extending between said first annular joint member and said second annular joint member, said seals having said fluid-filled annulus therebetween, said vibratory motions inducing motions in said seals of said rotary joint and said motions in said seals reducing initial torque for initial rotational displacement of at least one of said annular joint members and assuring smoothness of continuing displacement of at least one of said annular joint members.

2. The system of claim 1 wherein said rotary joint is comprised of a spherical joint, said first annular joint member is comprised of an annular segment member, said second annular joint member is comprised of an upper annular female member and said seals are comprised of O-rings on said upper annular female member engaging said annular segment member to define said fluid-filled annulus.

* * * * *